(12) United States Patent
Gandhi et al.

(10) Patent No.: US 7,697,666 B2
(45) Date of Patent: Apr. 13, 2010

(54) PRE-CACHING MECHANISM FOR OPTIMIZED BUSINESS DATA RETRIEVAL FOR CTI SUB-SYSTEMS

(75) Inventors: Shailesh Gandhi, Boca Raton, FL (US); Peeyush Jaiswal, Boca Raton, FL (US); Yu-Cheng Liu, Powder Springs, GA (US); Naveen Narayan, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 11/393,977

(22) Filed: Mar. 30, 2006

(65) Prior Publication Data
US 2007/0263839 A1 Nov. 15, 2007

(51) Int. Cl.
*H04M 1/64* (2006.01)
(52) U.S. Cl. ............... 379/88.2; 379/142.06; 379/88.21
(58) Field of Classification Search ................ 379/88.2, 379/142.06, 88.21
See application file for complete search history.

(56) References Cited

U.S. PATENT DOCUMENTS

| 5,870,464 | A | 2/1999 | Brewster et al. |
| 5,884,032 | A | 3/1999 | Bateman et al. |
| 5,915,010 | A | 6/1999 | McCalmont |
| 6,760,727 | B1 | 7/2004 | Schroeder et al. |
| 6,766,009 | B2 * | 7/2004 | Williams et al. ............ 379/229 |
| 6,928,156 | B2 | 8/2005 | Book et al. |
| 7,023,979 | B1 * | 4/2006 | Wu et al. ............... 379/265.11 |
| 7,027,572 | B2 * | 4/2006 | Arunachalam ............. 379/88.2 |
| 7,366,293 | B2 * | 4/2008 | Ezerzer et al. ........... 379/265.1 |
| 7,536,434 | B1 * | 5/2009 | Rao et al. .................... 709/202 |
| 2004/0071275 | A1 | 4/2004 | Bowater et al. |
| 2005/0002510 | A1 | 1/2005 | Elsey et al. |
| 2005/0025127 | A1 | 2/2005 | Strathmeyer |
| 2006/0191994 | A1 * | 8/2006 | Steiger ....................... 235/379 |
| 2006/0229054 | A1 * | 10/2006 | Erola et al. ................. 455/403 |

* cited by examiner

*Primary Examiner*—Creighton Smith
(74) *Attorney, Agent, or Firm*—Dillon & Yudell LLP

(57) ABSTRACT

A method, system and computer-usable medium for optimizing retrieval of customer data needed to handle a call are presented. The method includes the steps of receiving a call at a data center; initiating a query for a business data related to the call; creating a key that identifies the business data related to the call; pre-fetching the business data using the key with a lookup table; caching the pre-fetched business data; attaching the key to the call; routing the call with the attached key to a desktop agent; receiving a request from the desktop agent for the pre-fetched business data; retrieving the cached pre-fetched business data; and transmitting the cached pre-fetched business data to the desktop agent.

20 Claims, 13 Drawing Sheets

PRE-CACHING MECHANISM FOR OPTIMIZED BUSINESS DATA RETRIEVAL FOR CTI SUB-SYSTEMS

BACKGROUND OF THE INVENTION

1. Technical Field

The present invention relates in general to the field of computers, and in particular to data management in a computer system. Still more particularly, the present invention relates to pre-retrieving and pre-caching data for a call center.

2. Description of the Related Art

To provide service and support to customers, businesses today often rely on centralized service centers, which are often shared with other businesses and/or with other departments within a single enterprise. The service center includes a data center, in which calls are initially received and triaged, and the destination service desk (which may be staffed by an employee of either the enterprise that has contracted for service with the data center or a Third Party Administrator (TPA) under contract with either the data center or the enterprise). Thus, a call from a customer to the enterprise, which is usually made to a toll-free number, is initially received at the data center, and then routed to an appropriate agent in an appropriate enterprise/department/TPA.

Since the data center is often shared among multiple enterprises or departments within an enterprise, business data for these multiple entities can seldom be retrieved optimally, particularly when the call is to a data center that uses an Interactive Voice Response (IVR) application and Screen-Pops. The IVR application is a voice recognition system that, based on spoken responses to prepared questions from the IVR application, routes the call to the appropriate agent in the appropriate enterprise/department. (Alternatively, information responses may be input by a caller on a telephone keypad where the data center is a Dual tone Modulated Frequency (DTMF) based system.) The Screen-Pops are pop-up windows that are populated with data needed by the agent, such as the caller's name, business history, account history, personal or security data, etc. In general, IVR applications reside within the data center, and calls being treated by the IVR application have to wait several seconds before business data can be retrieved and the call can be routed to an appropriate agent with a populated Screen-Pop. The wait period is exacerbated by data legacy systems, which often take a long time to access. Holding the call at the data center ties up an IVR port at the data center for several seconds, and therefore is extremely expensive (in terms of resource usage). Furthermore, such delays cause customer dissatisfaction. Thus, a main objective of the data center is to pass the call on to the appropriate agent, with the needed customer data, as soon as possible.

SUMMARY OF THE INVENTION

The present invention recognizes the need for a method for optimizing the routing of a call to a desktop agent and populating that desktop agent with data needed to handle the call, and thus presents a method, system and computer-usable medium that address this need. The method includes the steps of receiving a call at a data center; initiating a query for a business data related to the call; creating a key that identifies the business data related to the call; pre-fetching the business data using the key with a lookup table; caching the pre-fetched business data; attaching the key to the call; routing the call with the attached key to a desktop agent; receiving a request from the desktop agent for the pre-fetched business data; retrieving the cached pre-fetched business data; and transmitting the cached pre-fetched business data to the desktop agent.

In one embodiment, after initial Interactive Voice Response (IVR) treatment, an IVR application in the data center initiates a query to a business connector. The business connector receives a query and responds with a key, which is an identifier in a look-up table for customer data that will be needed by an agent who assigned to handle a call to the data center. The call is then routed with the key attached to it (e.g., in a header of a digital data packet that contains the call routing instructions to the agent) to a destination, such as an agent in a Customer Service Representative (CSR) center. While the call is being routed to the CSR center, a business object in the business connector simultaneously initiates a data query to a data application, which may be a legacy application, requesting data that will be needed by the CSR (agent) to properly handle the call. This data may be based on the telephone number that the call is made to (assuming that the data center is able to field calls to multiple numbers), the telephone number of the caller, information input by the caller via IVR or telephone touchpad entries, etc. Results of the data query are cached and catalogued (identified; cross-referenced) in a look-up table. When the call reached the CSR, a CSR application queries the business object in the business connector for needed data using the key that is attached to the call. The business object, using the key, locates a cache address of the needed data in the look-up table, and retrieves and sends the needed data to the CSR, preferably to a Screen-Pop program that is populated by the retrieved cache data. Once the data is sent to the CSR, it (preferably) is deleted from the business object's cache memory.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
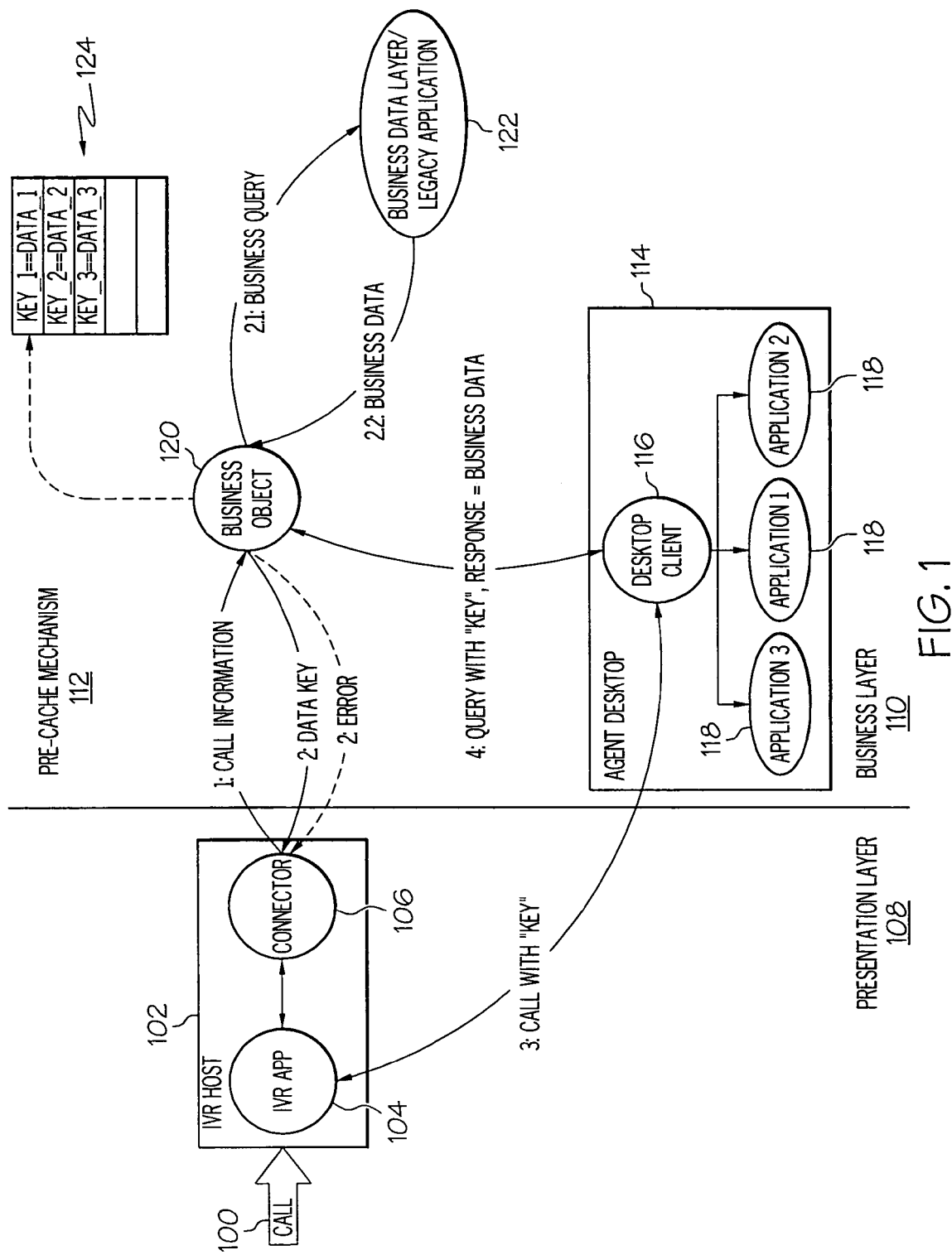
FIG. 1 depicts an infrastructure context in which data is pre-fetched in response to a call to a service agent.

With reference now to the figures, and in particular to FIG. 1, there is depicted a diagram of software infrastructure utilized in an exemplary embodiment of the present invention to create an optimized call flow with needed data for handling the call. A call 100 is received by an Interactive Voice Response (IVR) host 102, which includes an IVR application 104 that communicates with a business connector 106. Note that IVR host 102 is part of a presentation layer 108, and communicates with a business layer 110, which includes a pre-cache mechanism 112 (which is further defined and described below). When the IVR host 102 receives the call 100, connector 106 presents a query, along with call information, to a business object 120 in pre-cache mechanism 112. The query is for data needed by a service representative to assist the customer that placed the call. The query is based on call information, which may be any call parameters defined by the architect of the system, including Automatic Number Identification (ANI), Dialed Number Identification Service (DNIS), Caller Entered Information (CEI), etc. The ANI is a service that provides IVR host 102 with the telephone number of the system that sent call 100. DNIS is a telephone service that identifies, for IVR host 102, the number that call 100 was placed (dialed) to (assuming that IVR host 102 is able to intake calls to different numbers). Thus, if IVR host 102 handles calls to toll-free numbers that are sponsored by different enterprises/entities, DNIS can identify which toll-free number was called, thereby providing useful information for accessing business data as described below. Note also that the call parameter may be the CEI, such as voice responses to pre-recorded questions posed by IVR host 102 (e.g., the name of the department or service being requested, the caller's social security number, the caller's name, etc.). Alternatively, the CEI may be inputs into a telephone keypad that are entered by the caller in response to prompts for information such as an account number, a social security number, an employee identifier, etc.

As indicated by step 1 in FIG. 1, this call information is presented to business object 120 as a query for any business data that is relevant to the call information. For example, if the call information is an account number of the caller, then the business object 120 may retrieve an account history of charges and payments for that account.

When business object 120 receives the call information, it generates and assigns a key to that call information. For example, assume that the call information includes the caller's name, the caller's account number, and the year for which the caller is asking for information about his account. Business object 120 then builds a lookup table 124, which assigns "Key 1" with "Data 1" (data that is related to the caller's name), "Key 2" with "Data 2" (data that is related to the caller's account number), and "Key 3" with "Data 3" (data that causes the retrieval of account data only for a particular year). At this point, business object 120 begins two operations simultaneously. The first operation is to send back to connector 106 the names of the (one or more) keys that have been assigned to the call 100 based on the call parameters. (Note that if none of the call parameters match a data descriptor located in lookup table 124, an error is returned to IVR host 102, indicating that there is no relevant information for that call parameter available to populate a Screen-Pop as described below.) These key(s) are then appended to call 100, such as to a header that describes features of the call 100. Included then in the header are not only keys that identify the call parameters described above, but also the destination address (i.e., the agent desktop 114) for the call. Thus, when the call 100 is sent to agent desktop 114, the key(s) are appended to the call itself, as indicated by step 3.

While business object 120 is sending the above described key(s) to IVR host 102, business object 120 is also obtaining and pre-fetching business data from a Business Data Layer/Legacy Application (BDLLA) 122. BDLLA 122 is a legacy database belonging to one of the enterprises that utilizes IVR host 102 to direct incoming calls to the appropriate agent desktop. Data in BDLLA 122 is used to populate a Screen-Pop, which appears on a monitor of the agent desktop 114 with pertinent information related to call 100. As described at step 2.1, business object 120 queries BDLLA 122 using input parameters (call parameters; call information) presented by IVR host 102 for the call 100 under consideration. As indicated by step 2.2, appropriate business data is returned from BDLLA 122 to business object 120, where it is contained/cached against the data key(s) that were returned to IVR application 104 in step 2. Business object now has the business data readily cached and cross-referenced to the key(s) that are attached to call 100 (after being sent from IVR host 102 to agent desktop 114). Note that business object 120, BDLLA 122 and lookup table 124 are all part of a pre-cache mechanism 112, and pre-cache mechanism 112 and agent desktop 114 are all part of a business layer 110. Note further that agent desktop 114 includes a desktop client 116, which includes access to and control of applications 118, one of which may be a Screen-Pop application.

Referring now to step 4, when desktop client 116 receives call 100 with the appended key(s), desktop client 116 sends a query to business object 120 for any cached business data whose cache address in business object 120 is associated with the call-appended keys 1, 2 and 3. In the example above, desktop client 116 would send a request to business object for any business data identified in lookup table 124 for information related to the caller's name (Key 1), the caller's account number (Key 2), and the year that the caller is asking about (Key 3). Business object 120 then sends this business data (which was previously retrieved from BDLLA 122 and cached in business object 120) to desktop client 116, which uses this business data to populate the Screen-Pop application for use by the servicing agent.

Figure 2:
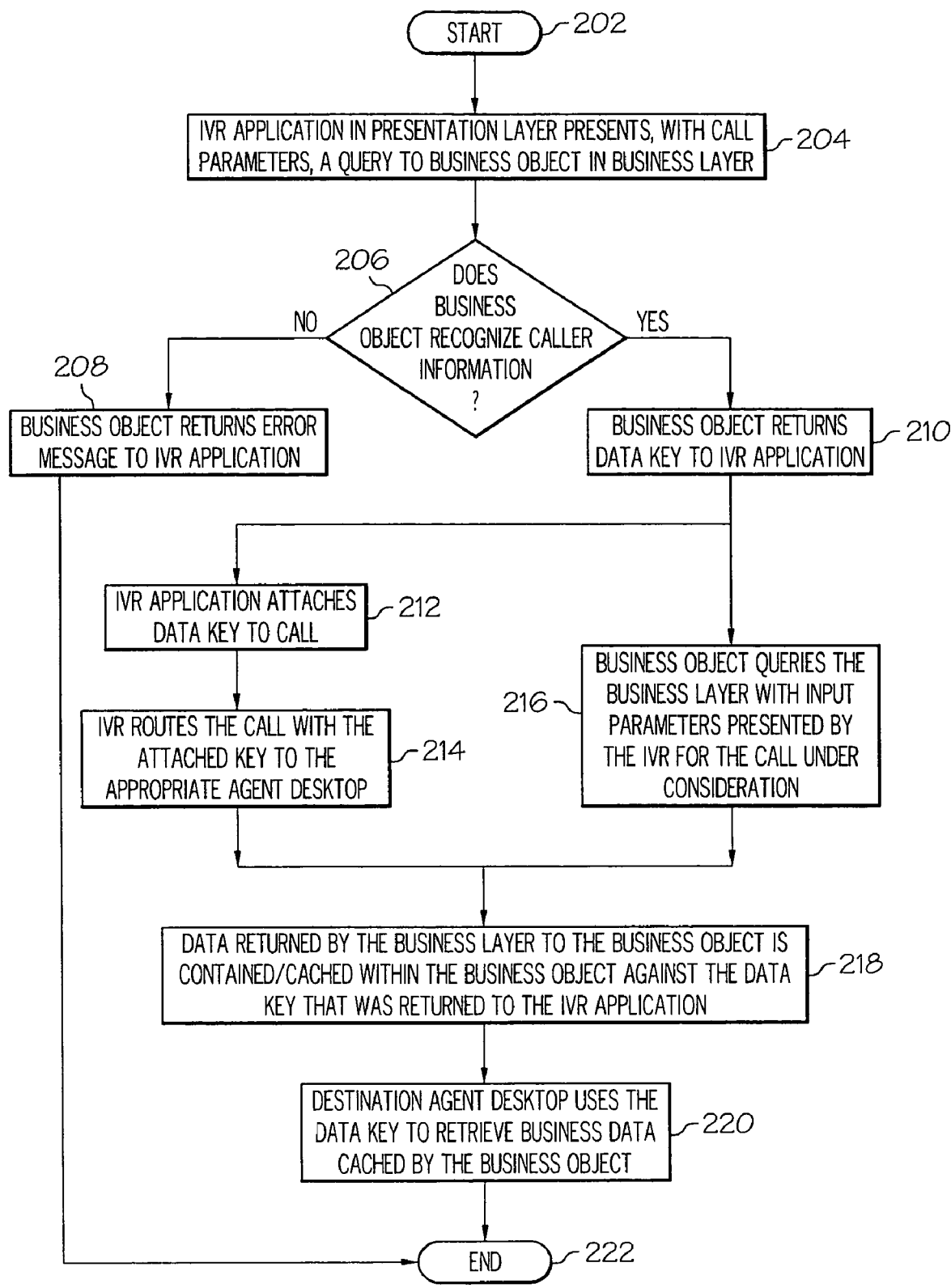
FIG. 2 is a flow-chart of exemplary steps taken to pre-fetch data in response to a service agent.

Reference is now made to FIG. 2, which describes exemplary steps taken by the present invention, and correlating with the steps described in FIG. 1. After initiator block 202 in FIG. 2, an IVR application in the presentation layer presents a query, using call parameters, to a business object in the business layer (block 204). If the business object does not recognize the caller information (call parameters sent by the IVR application), as described in query block 206, then the business object returns an error message to the IVR application (block 208), and the process ends (terminator block 222). However, if the business object does recognize the caller information, then the business object returns one or more data keys to the IVR application (block 210). The IVR application then attaches the data key(s) to the call (block 212), and then routes the call with the attached key to the appropriate agent desktop (block 214). Concurrently, the business object queries the business layer, using input parameters presented by the IVR for the call under consideration (block 216). Data that is returned by the business layer to the business object is contained/cached within the business object against the data key(s) that was returned to the IVR application (block 218). Since the destination agent desktop has the data key (obtained from the routed call), the destination agent desktop can then use that data key to retrieve the business data that was cached by the business object (block 220), which then deletes the business data from the business object's cache, and the process ends (terminator block 222).

Figure 3:
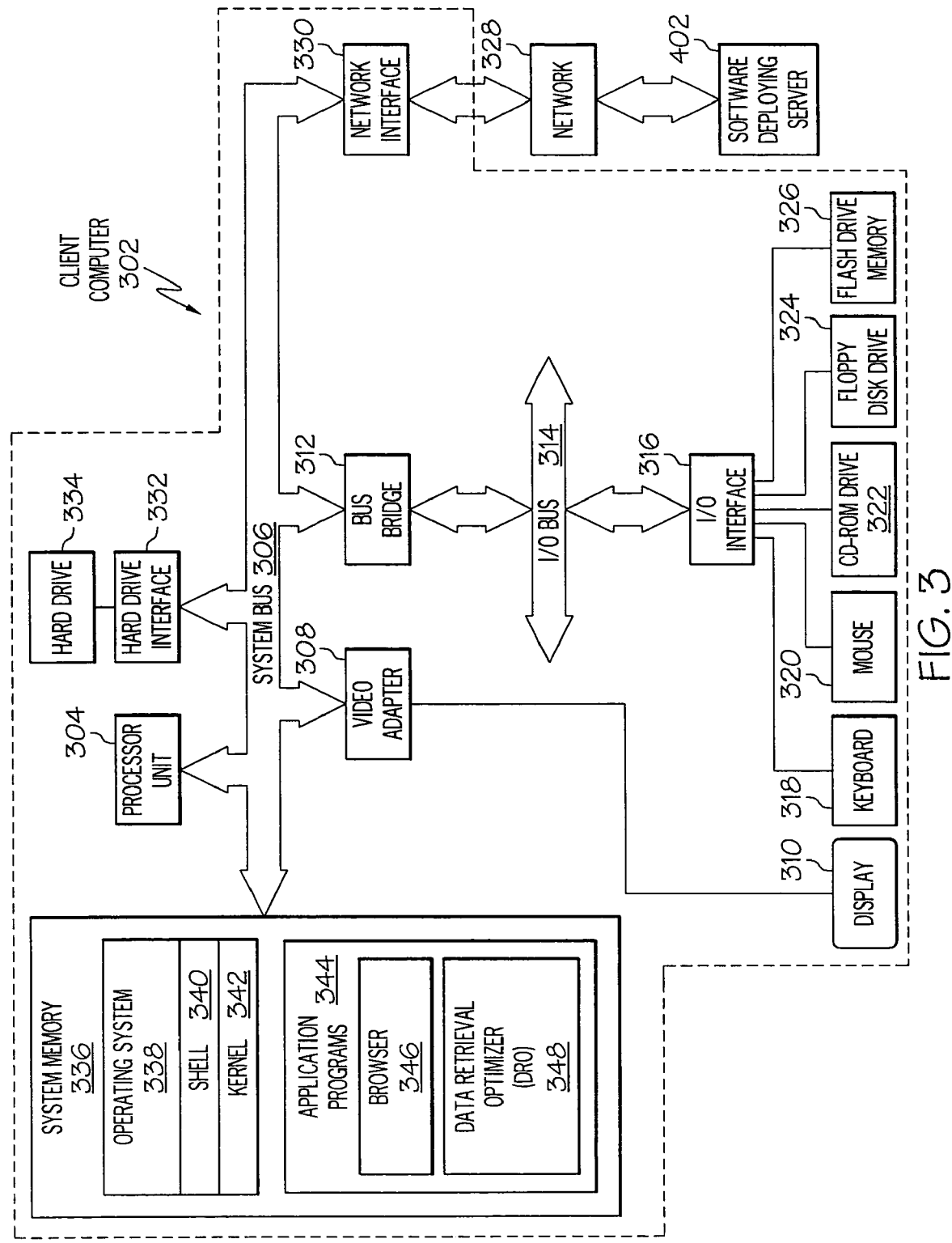
FIG. 3 depicts an exemplary computer which can be utilized in the service center in accordance with the present invention.

With reference now to FIG. 3, there is depicted a block diagram of an exemplary client computer 302, whose architecture may be used by IVR host 102, agent desktop 114, and pre-cache mechanism 112 (that is, host 102, agent desktop 114, and pre-cache mechanism 114 are physically distinct systems that use similar architecture as described in FIG. 3). Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Client computer 302 is able to communicate with a software deploying server 402 via a network 328 using a network interface 330, which is coupled to system bus 306. Network 328 may be an external network such as the Internet, or an internal network such as an Ethernet or a Virtual Private Network (VPN).

A hard drive interface 332 is also coupled to system bus 306. Hard drive interface 332 interfaces with a hard drive 334. In a preferred embodiment, hard drive 334 populates a system memory 336, which is also coupled to system bus 306. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with software deploying server 402.

Application programs 344 in client computer 302's system memory also include a Data Retrieval Optimizer (DRO) 348. DRO 348 includes code for implementing the processes described in FIGS. 1-2. In one embodiment, client computer 302 is able to download DRO 348 from software deploying server 402.

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

Figure 4:
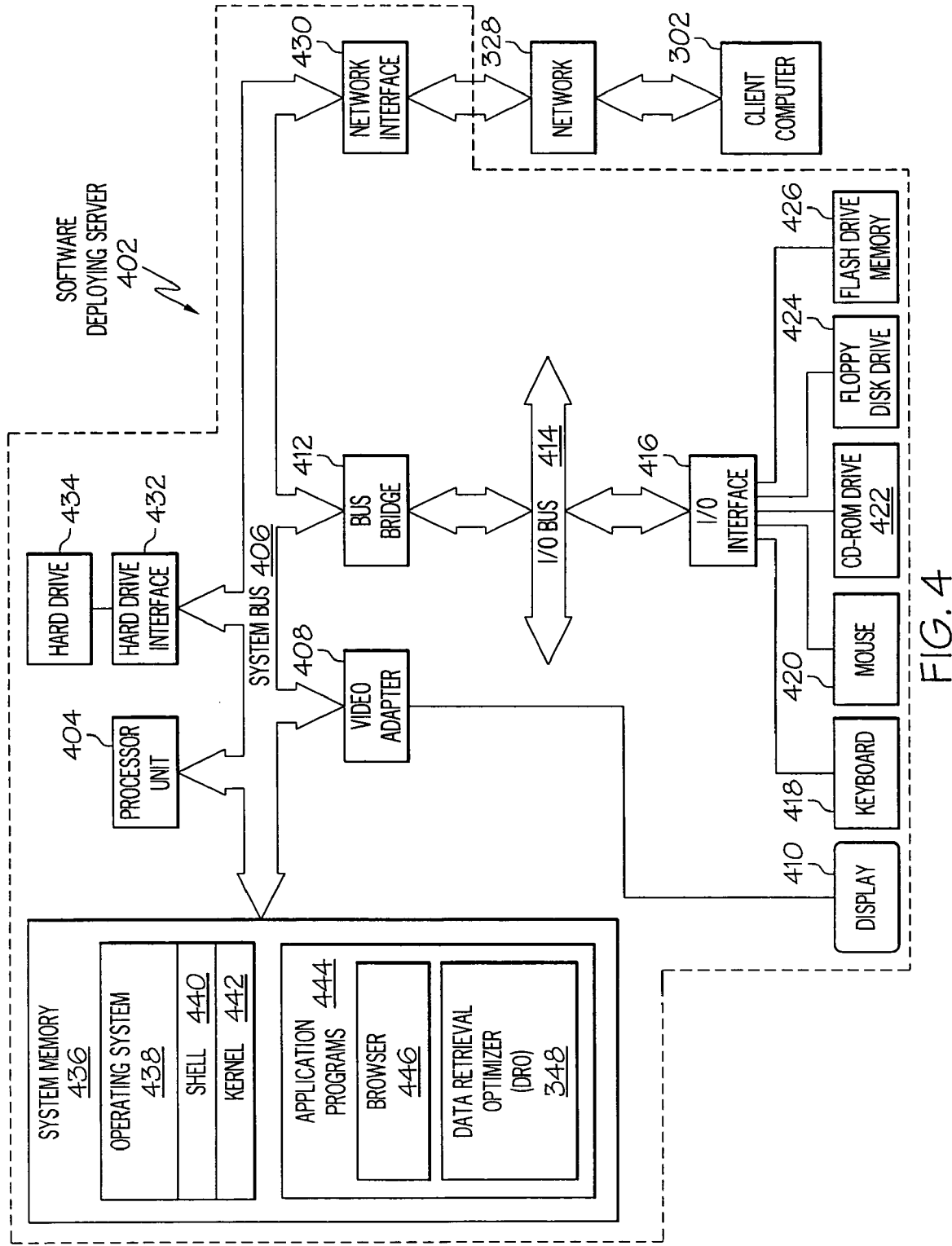
FIG. 4 illustrates a software deploying service that is capable of deploying software to the client computer shown in FIG. 3 to implement the present invention.

As noted above, DRO 348 can be downloaded to client computer 302 from software deploying server 402, shown in exemplary form in FIG. 4. Software deploying server 402 includes a processor unit 404 that is coupled to a system bus 406. A video adapter 408 is also coupled to system bus 406. Video adapter 408 drives/supports a display 410. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk - Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Software deploying server 402 is able to communicate with client computer 302 via network 328 using a network interface 430, which is coupled to system bus 406. Access to network 328 allows software deploying server 402 to deploy DRO 348 to client computer 302.

System bus 406 is also coupled to a hard drive interface 432, which interfaces with a hard drive 434. In a preferred embodiment, hard drive 434 populates a system memory 436, which is also coupled to system bus 406. Data that populates system memory 436 includes software deploying server 402's operating system 438, which includes a shell 440 and a kernel 442. Shell 440 is incorporated in a higher level operating system layer and utilized for providing transparent user access to resources such as application programs 444, which include a browser 446, and a copy of DRO 348 described above, which can be deployed to client computer 302.

The hardware elements depicted in software deploying server 402 are not intended to be exhaustive, but rather are representative to highlight essential components required by the present invention. For instance, software deploying server 402 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 402 performs all of the functions associated with the present invention (including execution of DRO 348), thus freeing client computer 302 from having to use its own internal computing resources to execute DRO 348.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

Thus, the method described herein, and in particular as shown and described in FIGS. 1-2, can be deployed as a process software from software deploying server 402 (shown in FIG. 4) to client computer 302 (shown in FIG. 3).

Figure 5A:
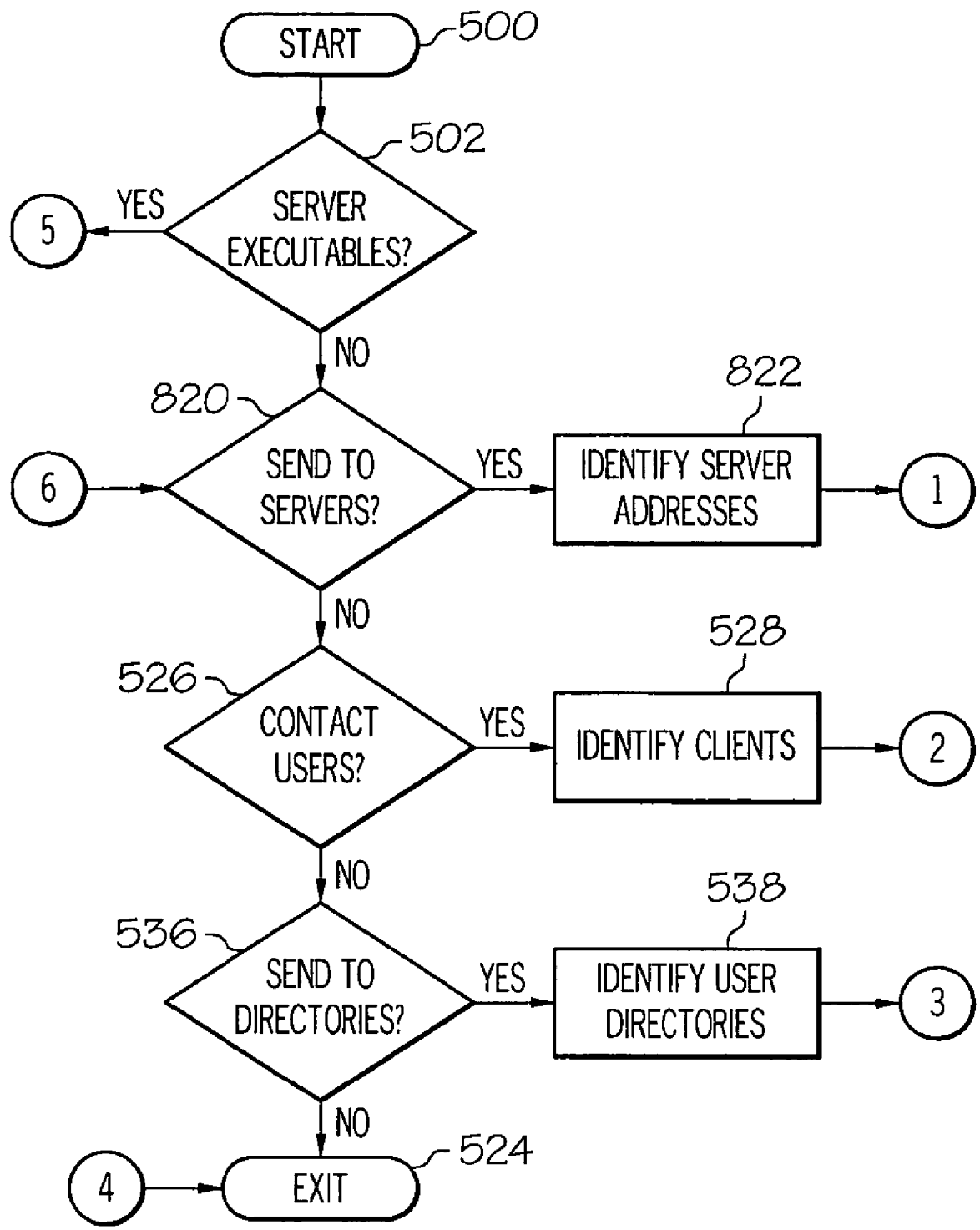
FIGS. 5a-b are flow-chart showing steps taken to deploy software capable of executing the steps shown in FIGS. 1-2.
Figure 5B:
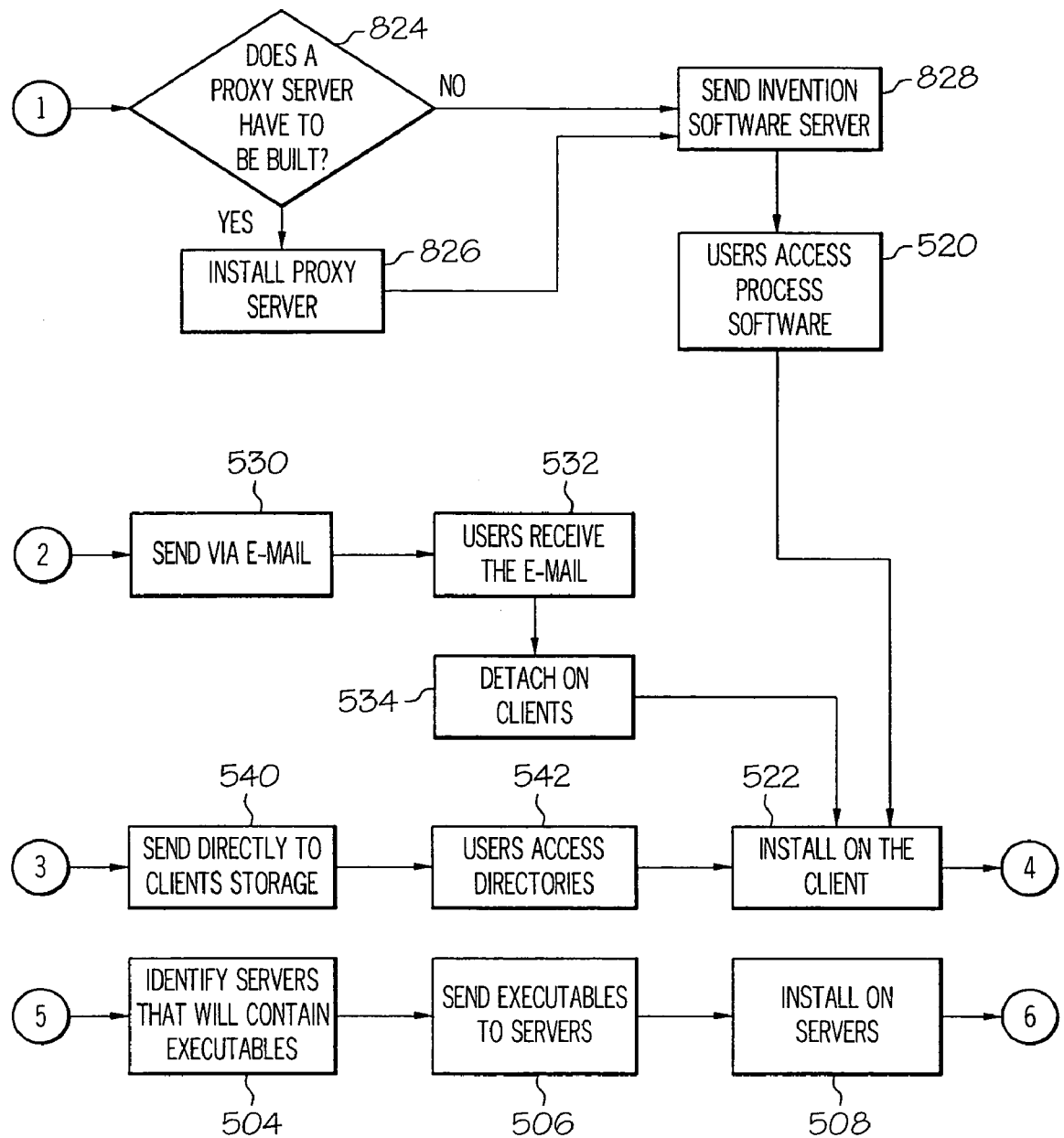

Referring then to FIG. 5, step 500 begins the deployment of the process software. The first thing is to determine if there are any programs that will reside on a server or servers when the process software is executed (query block 502). If this is the case, then the servers that will contain the executables are identified (block 504). The process software for the server or servers is transferred directly to the servers' storage via File Transfer Protocol (FTP) or some other protocol or by copying though the use of a shared file system (block 506). The process software is then installed on the servers (block 508).

Next, a determination is made on whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 520). Another embodiment is to have the servers automatically copy the process software to each client and then run the installation program for the process software at each client computer. The user executes the program that installs the process software on his client computer (i.e., client computer 302) (block 522) then exits the process (terminator block 524).

In query step 526, a determination is made whether the process software is to be deployed by sending the process software to users via e-mail. The set of users where the process software will be deployed are identified together with the addresses of the user client computers (block 528). The process software is sent via e-mail to each of the users' client computers (block 530). The users then receive the e-mail (block 532) and then detach the process software from the e-mail to a directory on their client computers (block 534). The user executes the program that installs the process software on his client computer (block 522) then exits the process (terminator block 524).

Lastly a determination is made on whether to the process software will be sent directly to user directories on their client computers (query block 536). If so, the user directories are identified (block 538). The process software is transferred directly to the user's client computer directory (block 540). This can be done in several ways such as, but not limited to, sharing of the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his client computer (block 522) and then exits the process (terminator block 524).

VPN Deployment

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 6A:
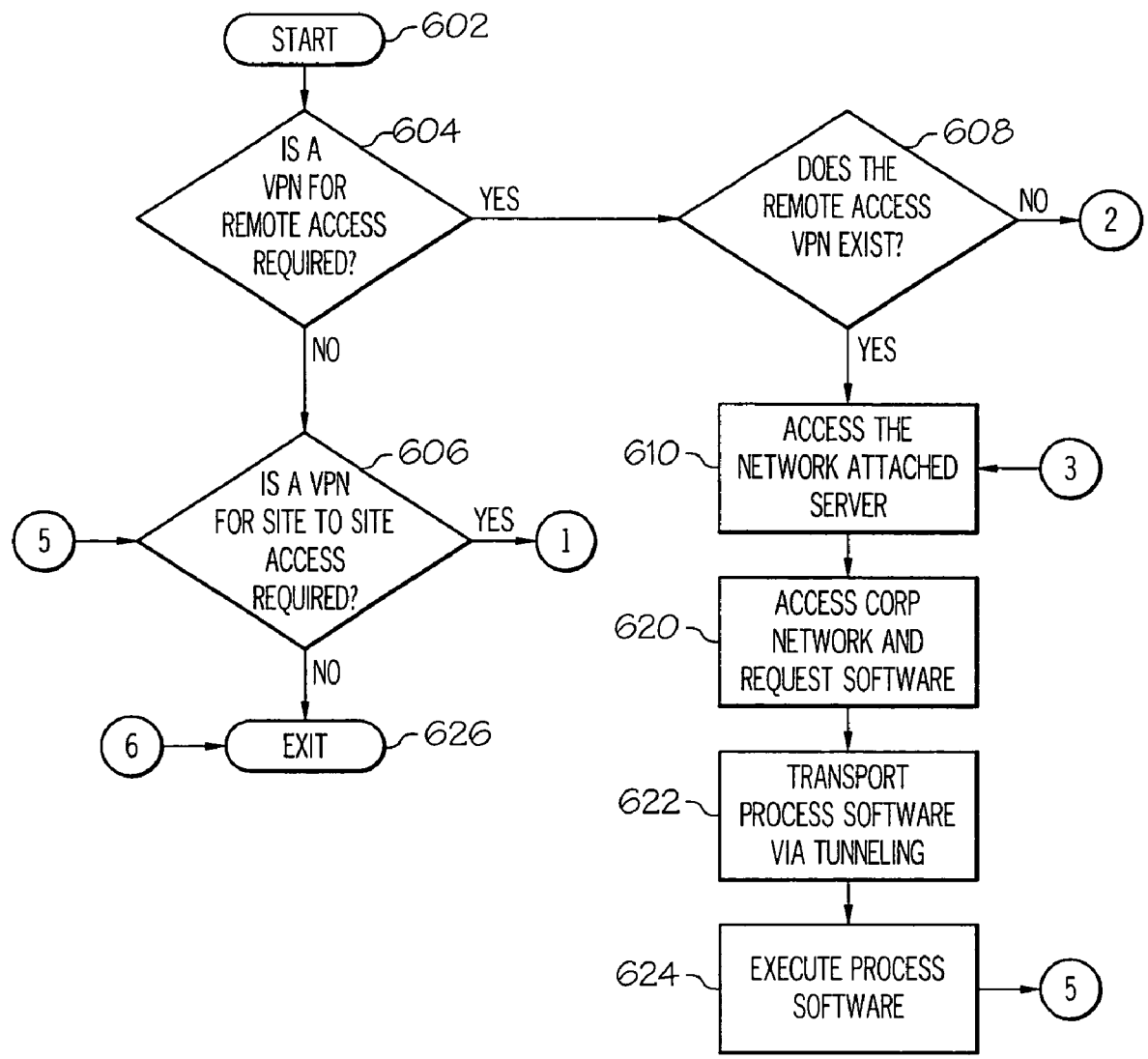
FIGS. 6a-c are flow-charts showing steps taken to deploy in a Virtual Private Network (VPN) software that is capable of executing the steps shown in FIGS. 1-2.
Figure 6B:
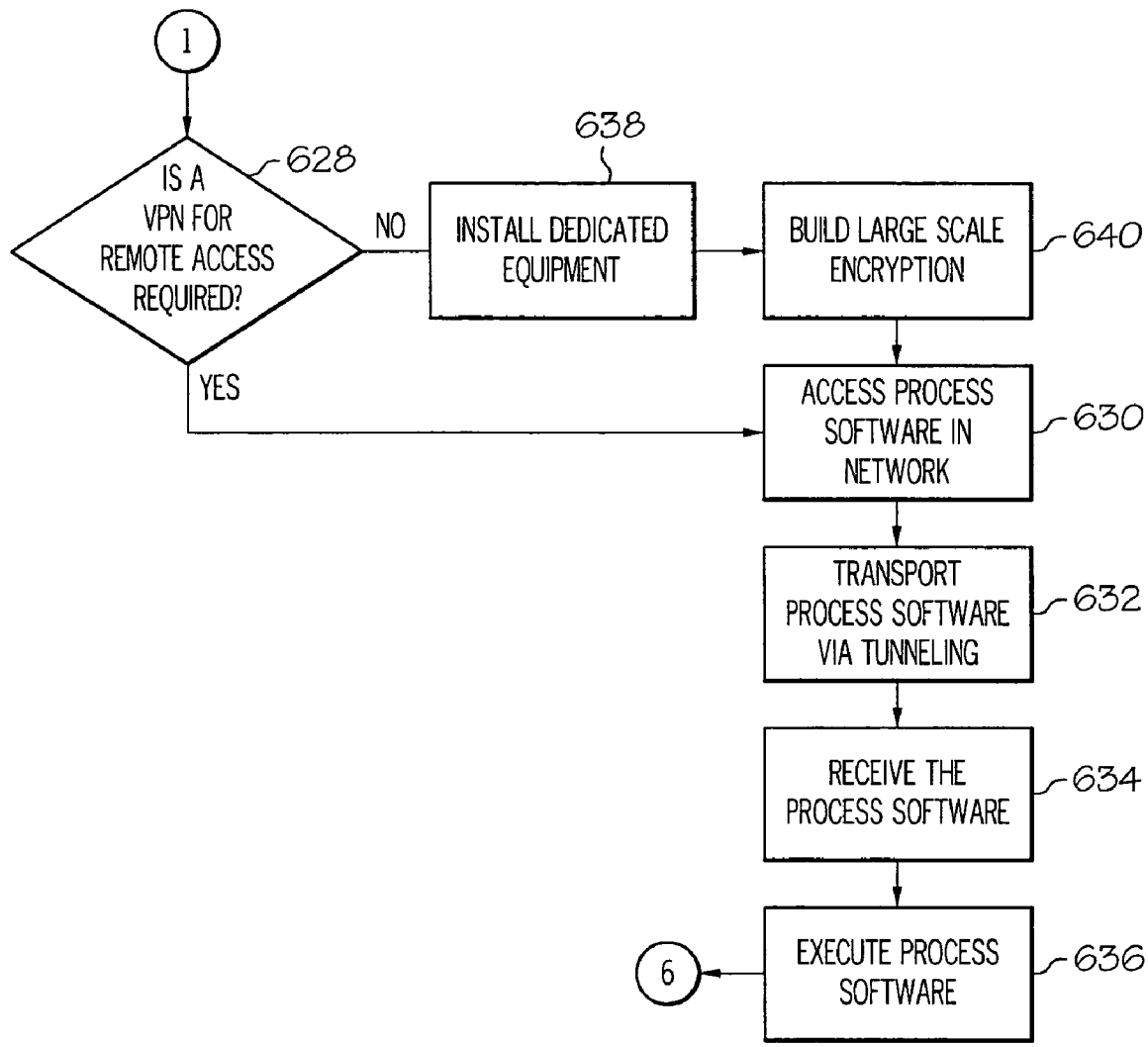
Figure 6C:
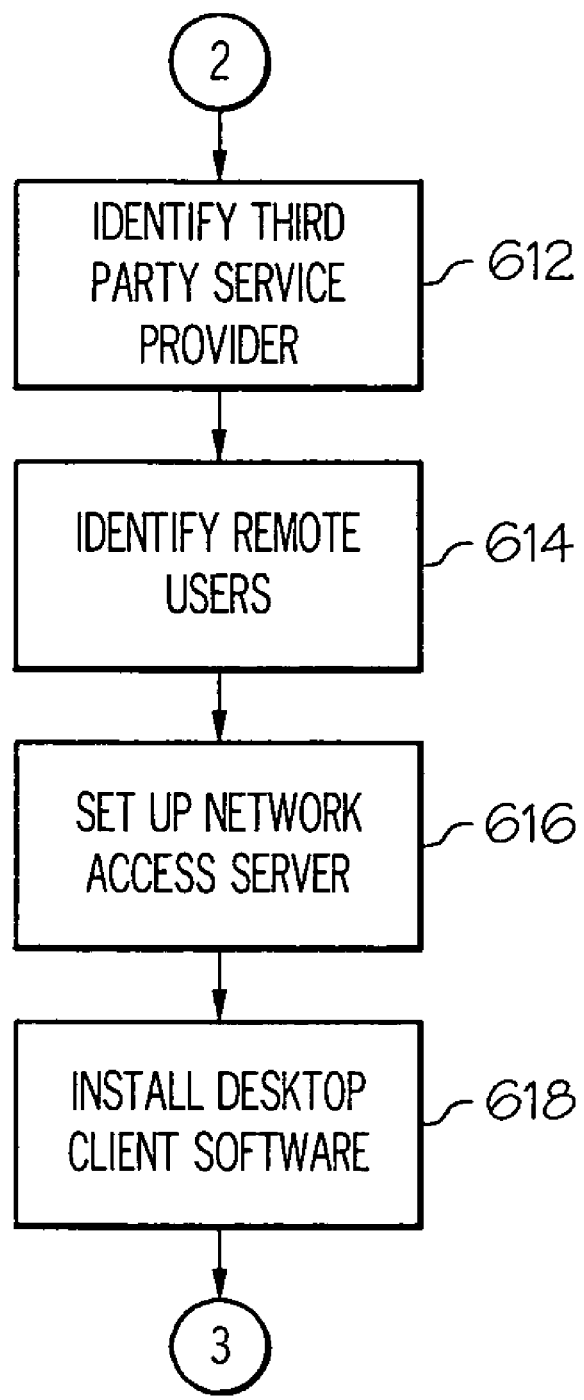

The process for such VPN deployment is described in FIG. 6. Initiator block 602 begins the Virtual Private Network (VPN) process. A determination is made to see if a VPN for remote access is required (query block 604). If it is not required, then proceed to query block 606. If it is required, then determine if the remote access VPN exists (query block 608).

If a VPN does exist, then proceed to block 610. Otherwise identify a third party provider that will provide the secure, encrypted connections between the company's private network and the company's remote users (block 612). The company's remote users are identified (block 614). The third party provider then sets up a network access server (NAS) (block 616) that allows the remote users to dial a toll free number or attach directly via a broadband modem to access, download and install the desktop client software for the remote-access VPN (block 618).

After the remote access VPN has been built or if it has been previously installed, the remote users can access the process software by dialing into the NAS or attaching directly via a cable or DSL modem into the NAS (block 610). This allows entry into the corporate network where the process software is accessed (block 620). The process software is transported to the remote user's desktop over the network via tunneling. That is, the process software is divided into packets and each packet including the data and protocol is placed within another packet (block 622). When the process software arrives at the remote user's desktop, it is removed from the packets, reconstituted and then is executed on the remote user's desktop (block 624).

A determination is then made to see if a VPN for site to site access is required (query block 606). If it is not required, then proceed to exit the process (terminator block 626). Otherwise, determine if the site to site VPN exists (query block 628). If it does exist, then proceed to block 630. Otherwise, install the dedicated equipment required to establish a site to site VPN (block 638). Then build the large scale encryption into the VPN (block 640).

After the site to site VPN has been built or if it had been previously established, the users access the process software via the VPN (block 630). The process software is transported to the site users over the network via tunneling (block 632). That is the process software is divided into packets and each packet including the data and protocol is placed within another packet (block 634). When the process software arrives at the remote user's desktop, it is removed from the packets, reconstituted and is executed on the site user's desktop (block 636). The process then ends at terminator block 626.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 7A:
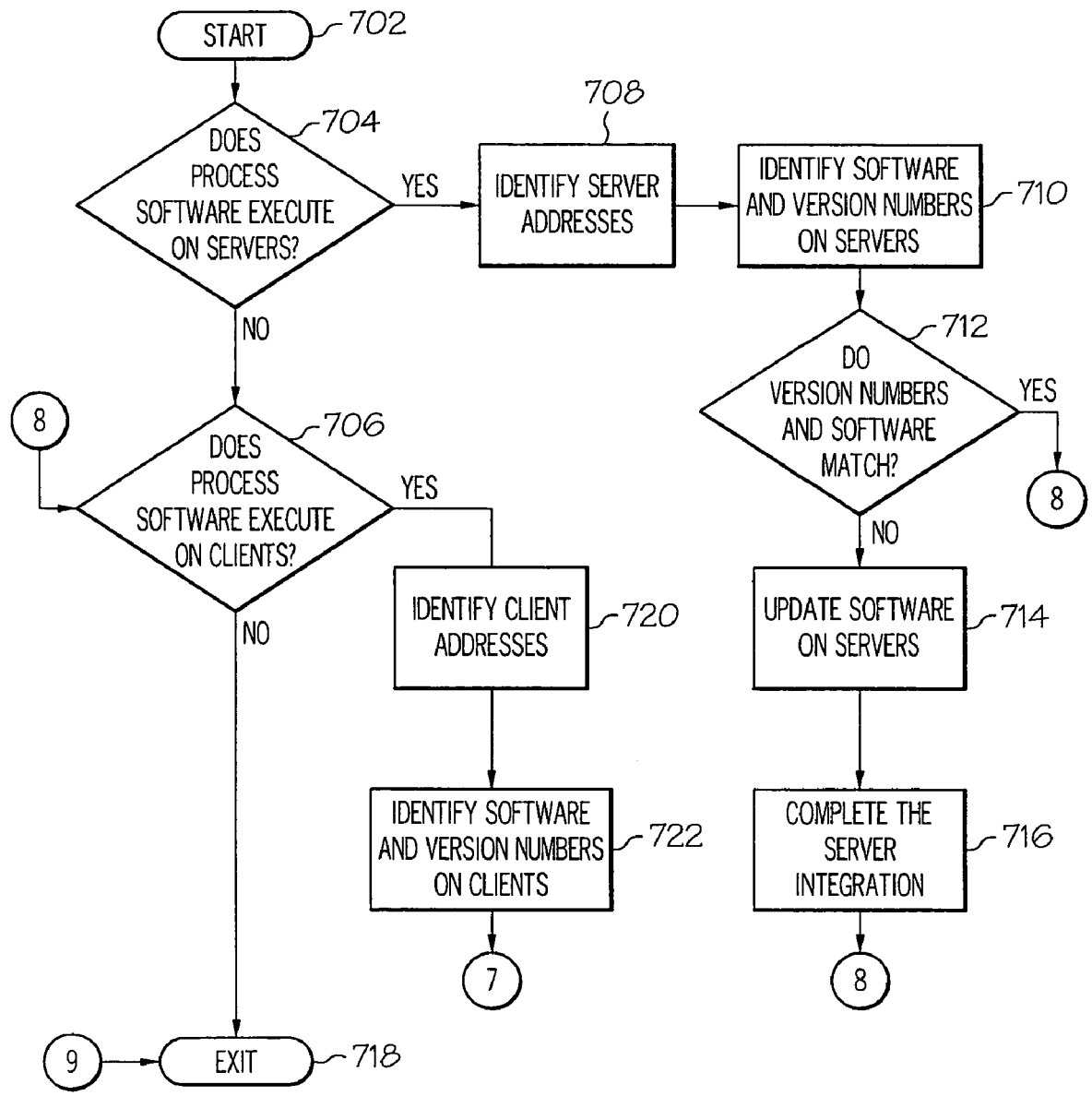
FIGS. 7a-b are flow-charts showing steps taken to integrate into an computer system software that is capable of executing the steps shown in FIGS. 1-2.
Figure 7B:
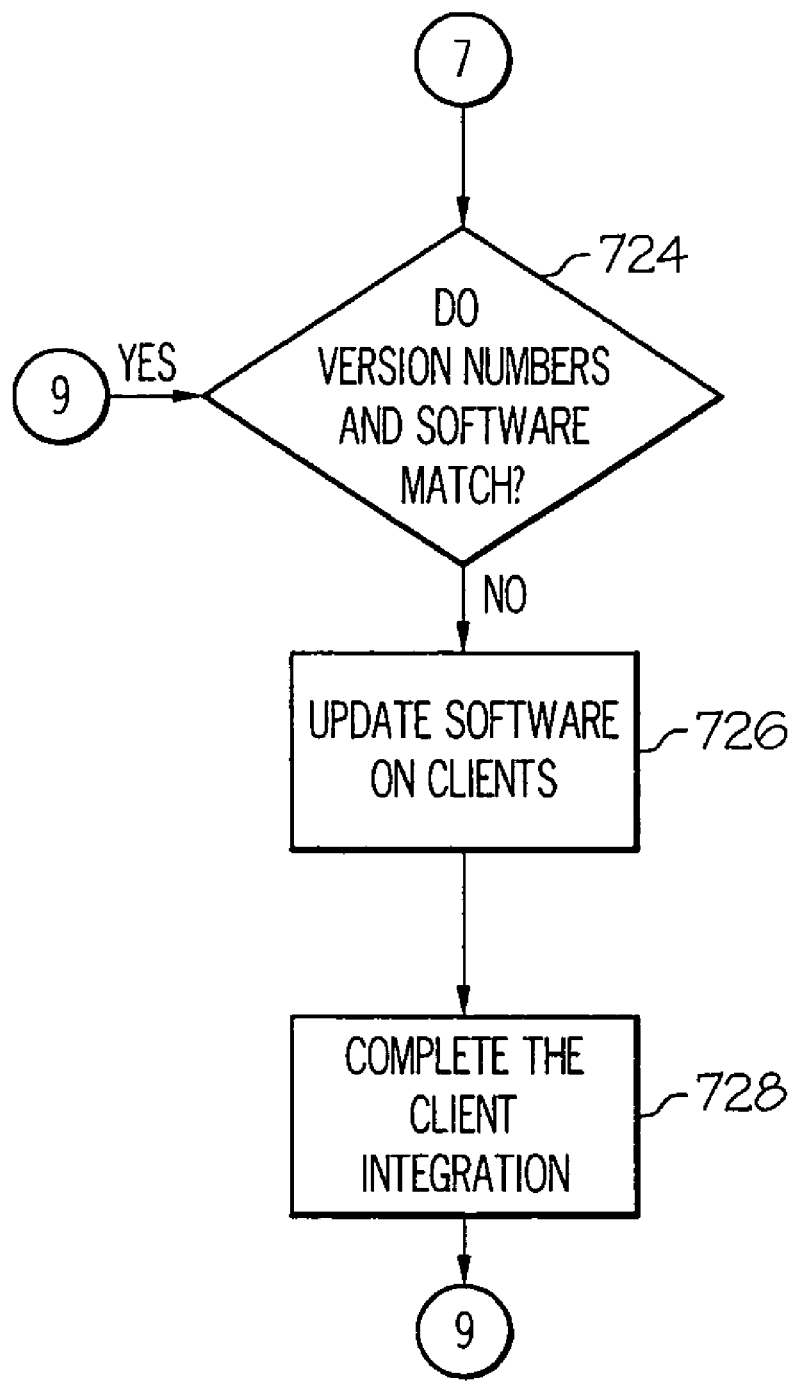

For a high-level description of this process, reference is now made to FIG. 7. Initiator block 702 begins the integration of the process software. The first tiling is to determine if there are any process software programs that will execute on a server or servers (block 704). If this is not the case, then integration proceeds to query block 706. If this is the case, then the server addresses are identified (block 708). The servers are checked to see if they contain software that includes the operating system (OS), applications, and network operating systems (NOS), together with their version numbers, which have been tested with the process software (block 710). The servers are also checked to determine if there is any missing software that is required by the process software in block 710.

A determination is made if the version numbers match the version numbers of OS, applications and NOS that have been tested with the process software (block 712). If all of the versions match and there is no missing required software the integration continues in query block 706.

If one or more of the version numbers do not match, then the unmatched versions are updated on the server or servers with the correct versions (block 714). Additionally, if there is missing required software, then it is updated on the server or servers in the step shown in block 714. The server integration is completed by installing the process software (block 716).

The step shown in query block 706, which follows either the steps shown in block 704, 712 or 716 determines if there are any programs of the process software that will execute on the clients. If no process software programs execute on the clients the integration proceeds to terminator block 718 and exits. If this not the case, then the client addresses are identified as shown in block 720.

The clients are checked to see if they contain software that includes the operating system (OS), applications, and network operating systems (NOS), together with their version numbers, which have been tested with the process software (block 722). The clients are also checked to determine if there is any missing software that is required by the process software in the step described by block 722.

A determination is made is the version numbers match the version numbers of OS, applications and NOS that have been tested with the process software (query block 724). If all of the versions match and there is no missing required software, then the integration proceeds to terminator block 718 and exits.

If one or more of the version numbers do not match, then the unmatched versions are updated on the clients with the correct versions (block 726). In addition, if there is missing required software then it is updated on the clients (also block 726). The client integration is completed by installing the process software on the clients (block 728). The integration proceeds to terminator block 718 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 8A:
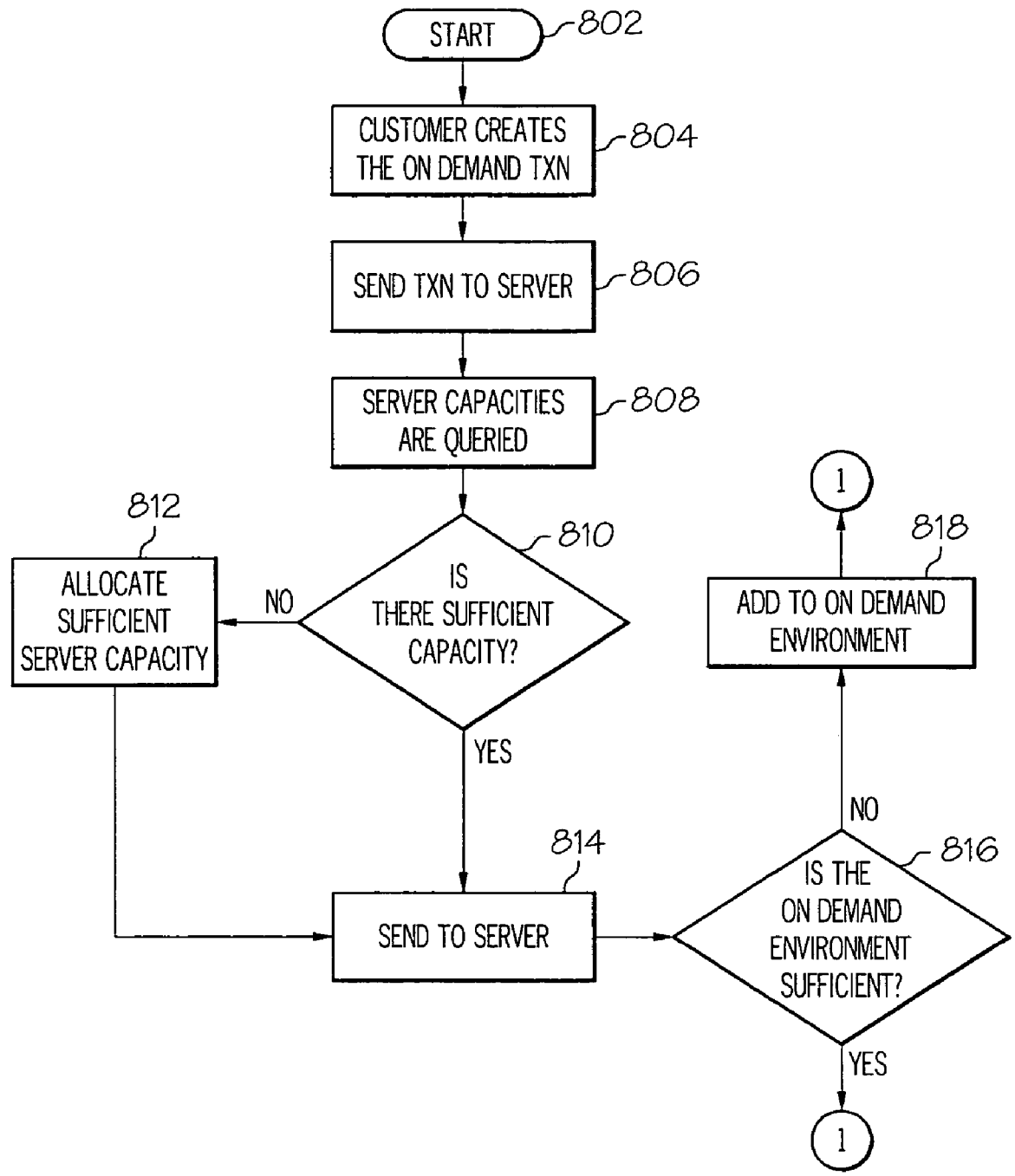
FIGS. 8a-b are flow-charts showing steps taken to execute the steps shown in FIGS. 1-2 using an on-demand service provider.
Figure 8B:
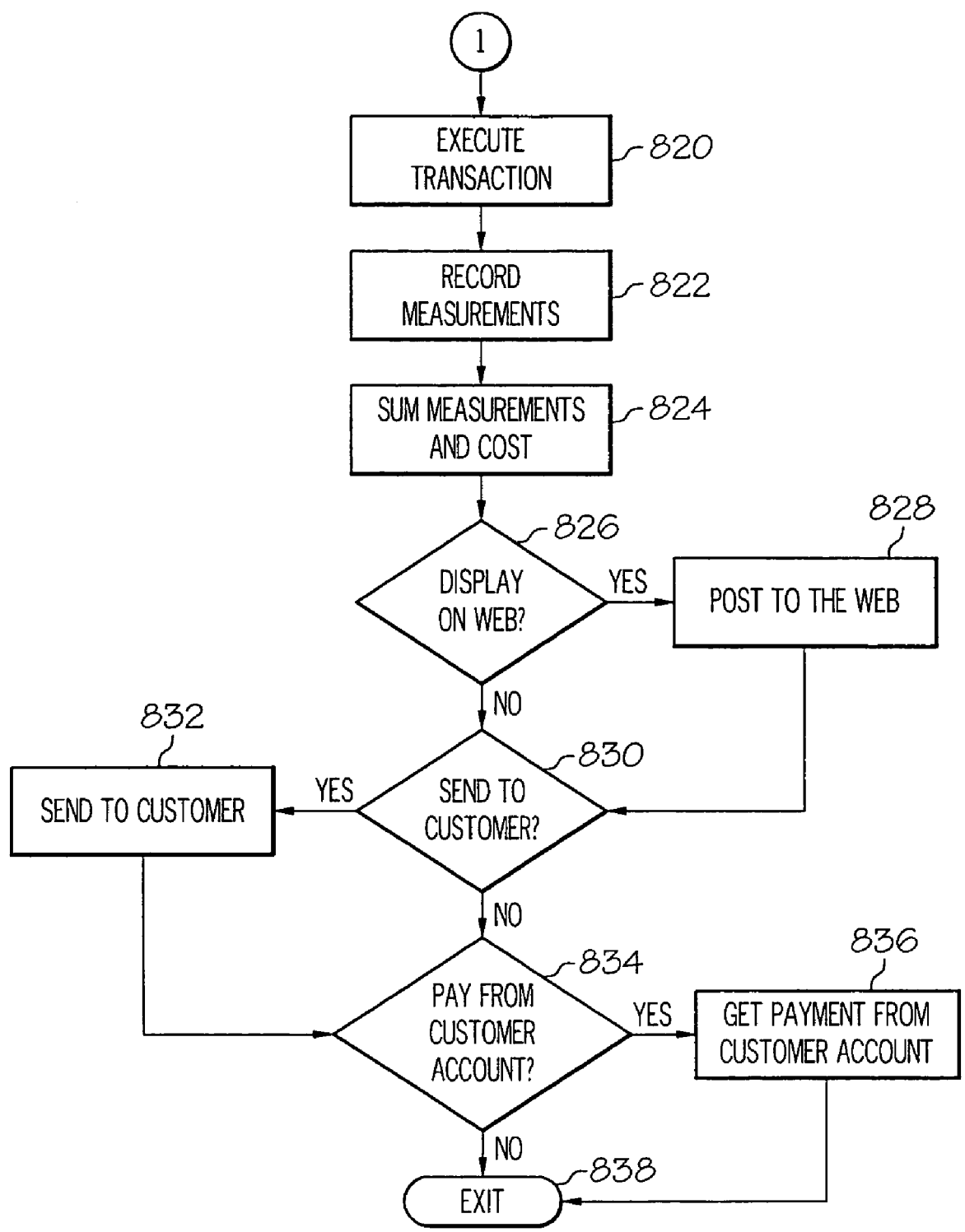

With reference now to FIG. 8, initiator block 802 begins the On Demand process. A transaction is created than contains the unique customer identification, the requested service type and any service parameters that further, specify the type of service (block 804). The transaction is then sent to the main server (block 806). In an On Demand environment the main server can initially be the only server, then as capacity is consumed other servers are added to the On Demand environment.

The server central processing unit (CPU) capacities in the On Demand environment are queried (block 808). The CPU requirement of the transaction is estimated, then the servers available CPU capacity in the On Demand environment are compared to the transaction CPU requirement to see if there is sufficient CPU available capacity in any server to process the transaction (query block 810). If there is not sufficient server CPU available capacity, then additional server CPU capacity is allocated to process the transaction (block 812). If there was already sufficient available CPU capacity then the transaction is sent to a selected server (block 814).

Before executing the transaction, a check is made of the remaining On Demand environment to determine if the environment has sufficient available capacity for processing the transaction. This environment capacity consists of such things as but not limited to network bandwidth, processor memory, storage etc. (block 816). If there is not sufficient available capacity, then capacity will be added to the On Demand environment (block 818). Next the required software to process the transaction is accessed, loaded into memory, then the transaction is executed (block 820).

The usage measurements are recorded (block 822). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 824).

If the customer has requested that the On Demand costs be posted to a web site (query block 826), then they are posted (block 828). If the customer has requested that the On Demand costs be sent via e-mail to a customer address (query block 830), then these costs are sent to the customer (block 832). If the customer has requested that the On Demand costs be paid directly from a customer account (query block 834), then payment is received directly from the customer account (block 836). The On Demand process is then exited at terminator block 838.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method comprising:
   receiving a call at a data center;
   initiating a query for a business data related to the call;
   creating a key that identifies the business data related to the call;
   pre-fetching the business data using the key with a lookup table;
   caching the pre-fetched business data;
   attaching the key to the call;
   routing the call with the attached key to an agent desktop;
   receiving a request from the desktop agent for the pre-fetched business data;
   retrieving the cached pre-fetched business data; and
   transmitting the cached pre-fetched business data to the agent desktop.

2. The method of claim 1, wherein the data center is an Interactive Voice Response (IVR) host.

3. The method of claim 1, wherein the business data is pre-fetched from a legacy application of an entity that is utilizing the data center to route calls to service agents of the entity.

4. The method of claim 1, wherein the business data is used to populate a Screen-Pop that displays the business data on an agent desktop.

5. The method of claim 1, wherein the agent desktop requests the pre-fetched business data by requesting business data that is cached in a business object that created the key, attached the key to the call, and pre-fetched the business data.

6. The method of claim 5, wherein multiple keys are assigned to the call, and wherein the multiple keys correspond with different types of business data that is cached by the business object and sent to the agent desktop in response to a key-identified request from the agent desktop to the business object.

7. A system comprising:
a processor;
a data bus coupled to the processor;
a memory coupled to the data bus; and
a computer-usable medium embodying computer program code, the computer program code comprising instructions executable by the processor and configured for:
receiving a call at a data center;
initiating a query for a business data related to the call;
creating a key that identifies the business data related to the call;
pre-fetching the business data using the key with a lookup table;
caching the pre-fetched business data;
attaching the key to the call;
routing the call with the attached key to an agent desktop;
receiving a request from the desktop agent for the pre-fetched business data;
retrieving the cached pre-fetched business data; and
transmitting the cached pre-fetched business data to the agent desktop.

8. The system of claim 7, wherein the data center is an Interactive Voice Response (IVR) host.

9. The system of claim 7, wherein the business data is pre-fetched from a legacy application of an entity that is utilizing the data center to route calls to service agents of the entity.

10. The system of claim 7, wherein the business data is used to populate a Screen-Pop that displays the business data on an agent desktop.

11. The system of claim 7, wherein the agent desktop requests the pre-fetched business data by requesting business data that is cached in a business object that created the key, attached the key to the call, and pre-fetched the business data.

12. The system of claim 11, wherein multiple keys are assigned to the call, and wherein the multiple keys correspond with different types of business data that is cached by the business object and sent to the agent desktop in response to a key-identified request from the agent desktop to the business object.

13. A computer-usable medium embodying computer program code, the computer program code comprising computer executable instructions configured for:
receiving a call at a data center;
initiating a query for a business data related to the call;
creating a key that identifies the business data related to the call;
pre-fetching the business data using the key with a lookup table;
caching the pre-fetched business data;
attaching the key to the call;
routing the call with the attached key to an agent desktop;
receiving a request from the desktop agent for the pre-fetched business data;
retrieving the cached pre-fetched business data; and
transmitting the cached pre-fetched business data to the agent desktop.

14. The computer-usable medium of claim 13, wherein the data center is an Interactive Voice Response (IVR) host.

15. The computer-usable medium of claim 13, wherein the business data is pre-fetched from a legacy application of an entity that is utilizing the data center to route calls to service agents of the entity.

16. The computer-usable medium of claim 13, wherein the business data is used to populate a Screen-Pop that displays the business data on an agent desktop.

17. The computer-usable medium of claim 13, wherein the agent desktop requests the pre-fetched business data by requesting business data that is cached in a business object that created the key, attached the key to the call, and pre-fetched the business data.

18. The computer-usable medium of claim 17, wherein multiple keys are assigned to the call, and wherein the multiple keys correspond with different types of business data that is cached by the business object and sent to the agent desktop in response to a key-identified request from the agent desktop to the business object.

19. The computer-useable medium of claim 13, wherein the computer executable instructions are deployable to a computer from a download server that is at a remote location.

20. The computer-useable medium of claim 13, wherein the computer executable instructions are provided by a download service provider to a service computer on an on-demand basis.

* * * * *